UNITED STATES PATENT OFFICE.

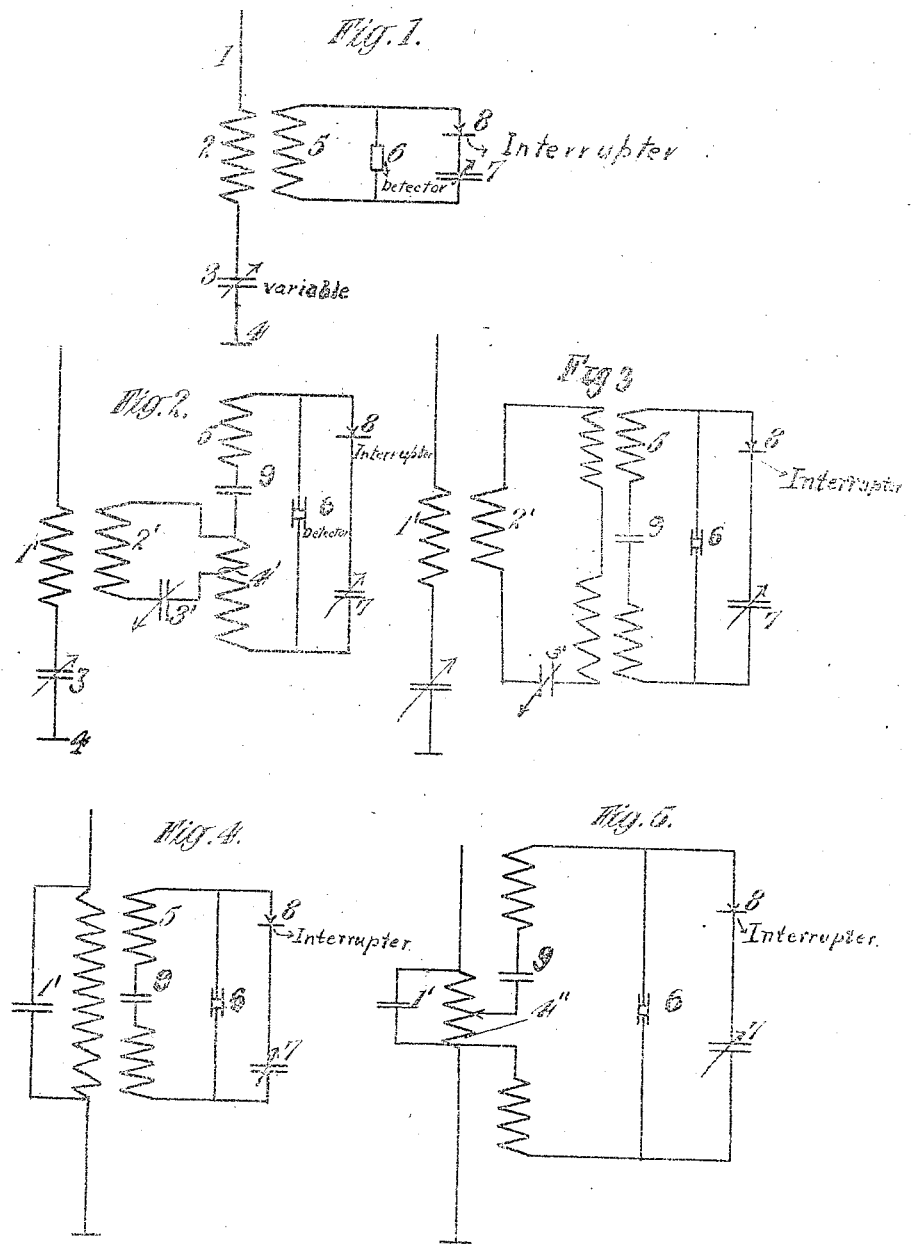

ERICH QUÄCK AND FRITZ V. D. WOUDE, OF BERLIN, GERMANY, ASSIGNORS TO FRANCIS WILLIAM PIXLEY AND HERBERT ALLEN, OF LONDON, ENGLAND.

RECEIVING SYSTEM FOR ELECTRICAL OSCILLATIONS.

936,163.

Specification of Letters Patent.  Patented Oct. 5, 1909.

Application filed April 27, 1908. Serial No. 429,457.

*To all whom it may concern:*

Be it known that we, ERICH QUÄCK and FRITZ VAN DER WOUDE, both subjects of the Emperor of Germany, residing at 13 Mathieustrasse, Berlin, in the Empire of Germany, have invented certain new and useful Improvements Relating to Receiving Systems for Electrical Oscillations, of which the following is a specification.

This invention relates to receiving systems for electrical oscillations and has particular reference to receiving systems for continuous electrical waves as set forth in the prior British patent to Pederson No. 14792 of 1906, according to which the detector is intermittently brought in connection with the receiving circuit by means of a suitable interrupting arrangement.

According to this invention the detector is permanently included within the oscillating circuit, and a condenser inserted in parallel to the detector is brought intermittently in connection with the oscillating circuit by an interrupting device of suitably arranged contacts.

In order that the invention may be clearly understood and readily carried into effect, it will now be described more fully with reference to the accompanying drawings, in which:—

Figure 1 represents diagrammatically one method of carrying the invention into practice, and Figs. 2, 3, 4 and 5 show modified arrangements of the method illustrated in Fig. 1.

In Fig. 1 the receiving antenna system comprises 1 the receiving antenna, 2 an inductance, 3 a variable condenser, and 4 the earth connection or counter capacity. With this antenna system is coupled an oscillatory circuit consisting of an inductance 5, a detector 6, a variable condenser 7 and a suitable interrupter 8 called a "ticker." When the aforesaid oscillatory circuit is tuned to the antenna the detector will be caused to respond as follows:—If the ticker is in its circuit completing position, the energy in the slightly damped circuit 5, 7, 8 will oscillate until it has reached its maximum amplitude. If now the ticker cuts out the condenser that is in parallel with the detector 6, the detector circuit 5, 6, will become out of resonance with the antenna so that the flux of energy from one circuit to the other will cease and the voltage in the detector circuit 5, 6, will rise because of the diminution of the capacity. This increase of voltage will then cause the detector to respond.

In Fig. 2 another arrangement is shown in which further means are used to increase the voltage in the detector circuit. 1′ represents the antenna system with which is inductively coupled a secondary circuit composed of an inductance 2′ and a variable condenser 3′. Directly connected with the secondary circuit through the common inductance at 4′ is the oscillatory circuit composed of inductances 4′ and 5, condenser 9, variable condenser 7, ticker 8, and detector 6. Circuit 1′ is in resonance with circuit 2′, 3′, and circuit 2′, 3′ is in resonance with the oscillatory circuit 4′, 9, 5, 8, 7. When the ticker is closed the capacity of the detector 6 and that of the condenser 7 are in parallel to each other. The capacities 7 and 6 together are small compared with capacity 9. When the ticker is open the energy flowing from the receiving antenna into the slightly damped secondary circuit 2′, 3′ may reach a maximum amplitude since the detector circuit 4′, 9, 5, 6, is out of resonance with the secondary circuit 2′, 3′ and does not rob it of energy. When the ticker is closed, the detector circuit is then in resonance with the secondary circuit 2′, 3′, so that energy then flows into the detector circuit and distributes there in the capacity present. Consequently the position and the magnitude of this capacity are of great importance. The capacity 9 must be large compared with 7 and 6 and 7 must be larger than 6. The capacity 9 must be arranged symmetrically to the inductance present, so that the detector will be situated within a maximum of potential. By so doing the sensibility of the system will be increased since it is necessary to increase the potential somewhat, in order to cause the detector to respond. When the ticker is open this increase of the potential will be performed by diminishing the capacity as mentioned above.

Fig. 3 shows the same connections as Fig. 2 with the exception that the secondary circuit is inductively coupled with the detector circuit.

Fig. 4 illustrates an arrangement disposing of the secondary circuit by inserting a tuned oscillatory circuit in the antenna. The detector circuit is inductively coupled with the antenna circuit.

Fig. 5 represents similar connections to those shown in Fig. 4 with the exception that the detector circuit is directly connected with the tuned oscillatory antenna circuit by the mutual inductance 4''.

What we claim and desire to secure by Letters Patent of the United States is:—

1. In a device of the character described, a receiving antenna, a tuned secondary circuit inserted in said antenna, a tuned oscillatory circuit inductively coupled thereto, a detector permanently included therein, a capacity, and means for connecting said capacity with said oscillatory circuit and disconnecting it therefrom intermittently.

2. In a device of the character described, a receiving antenna system, a tuned secondary circuit, an inductance inserted into said secondary circuit, a tuned oscillatory circuit, a detector permanently included in said oscillatory circuit, a capacity, and means for connecting and disconnecting intermittently said capacity with said oscillatory circuit.

3. In a device of the character described, a receiving antenna, an oscillatory circuit connected to said antenna, a tuned oscillatory circuit, a detector permanently included in said tuned oscillatory circuit, a variable capacity, means for intermittently connecting and disconnecting said variable capacity to said tuned oscillatory circuit whereby the flux of energy into said capacity is interrupted for short circuiting the energy through the detector, causing the detector to respond.

In testimony whereof we affix our signatures in presence of two witnesses.

ERICH QUÄCK.
FRITZ V. D. WOUDE.

Witnesses:
WOLDEMAR HAUPT,
HENRY HASPER.